April 30, 1935.  W. P. NEIL  1,999,775
DRAGLINE APPARATUS
Filed April 21, 1933
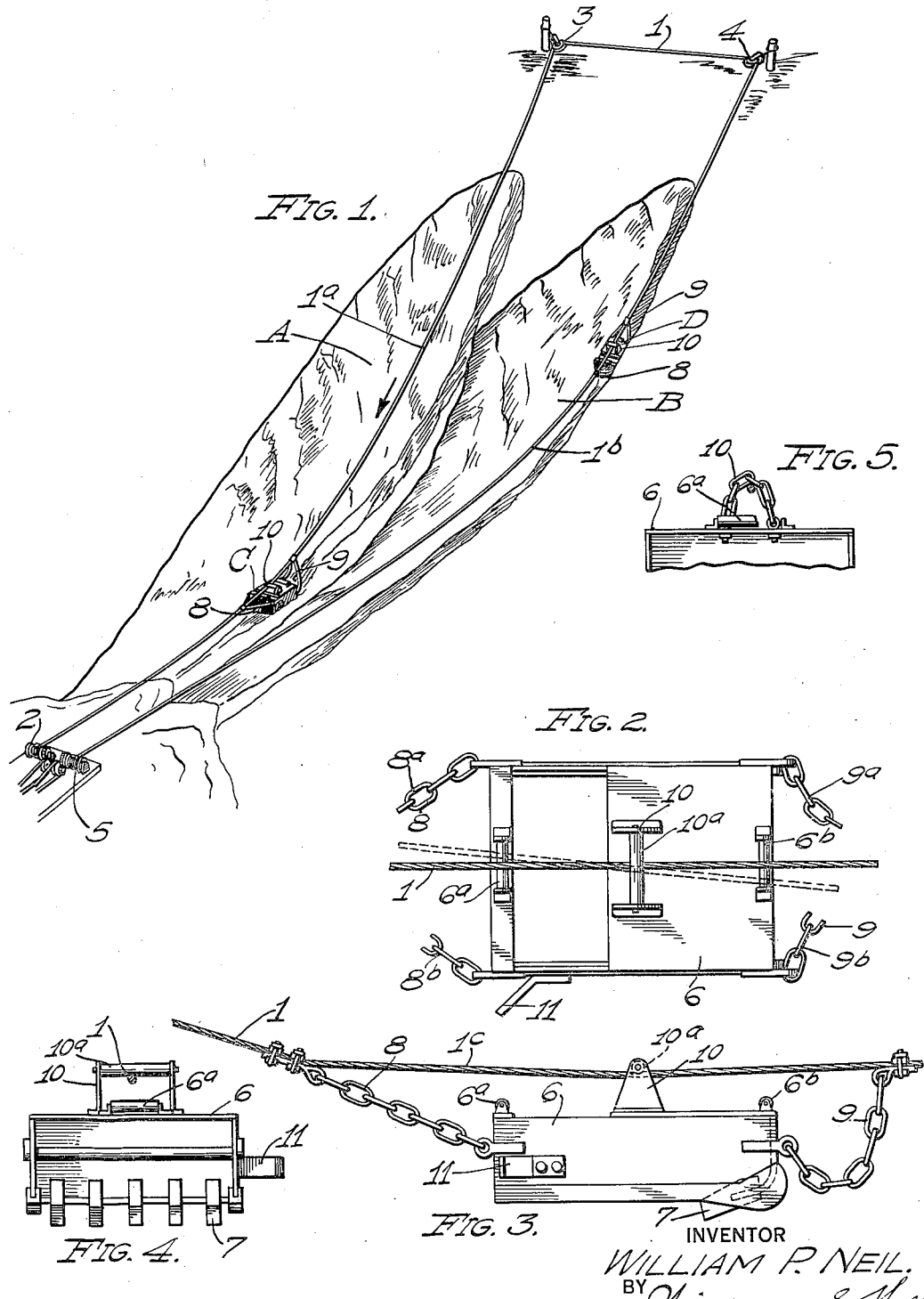
INVENTOR
WILLIAM P. NEIL.
BY
ATTORNEY Patented Apr. 30, 1935

1,999,775

UNITED STATES PATENT OFFICE 1,999,775

DRAGLINE APPARATUS

William P. Neil, Los Angeles, Calif.

Application April 21, 1933, Serial No. 667,136

14 Claims. (Cl. 37—115)

My invention relates to a dragline machine or apparatus.

The objects of this invention are:

First, to provide an apparatus of this class which has considerably larger capacity over other dragline apparatus now in use;

Second, to provide a tandem or double apparatus of this class so that, other things being equal, approximately twice as much material may be quarried as with a single apparatus and with a great deal less equipment and power;

Third, to provide a novel connection or a novel arrangement of the connection of the bucket or the draft hitch or guy means at the forward and rear side or end thereof, with the dragline or drag cable, so that the trailing hitch or guy means, connected to the drag cable is loose, free or slack, when the bucket is pulled by the other hitch or guy means attached to the drag cable, whereby the bucket is adapted to remain substantially level or to lie down normally on the bed being dragged;

Fourth, to provide a structure of this class in which the portion of the drag cable connecting the opposite or outer end of the hitch or guy means passes through a bridge or retaining means at the middle or upper portion of the bucket and is retained by said means, thus providing effective and efficient means to prevent the bucket from rolling over when the drag cable is taut or substantially so;

Fifth, to provide a digging bucket for an apparatus of this class which is provided with digging teeth or other digging means at the lateral side thereof so as to provide means for digging into the side of the bank or formation when the bucket is being dragged longitudinally through the depression or excavation from which the material is being quarried, and also to provide an adjustable hitch or guy means so that the bucket may be turned angularly to its longitudinal movement and thereby more prominently laterally extending the laterally positioned digging means in its digging action; and, Sixth, to provide as a whole a novelly constructed apparatus of this class and one which is simple and economical of construction, durable and which will not readily deteriorate or get out of order.

With these and other objects in view, as will appear hereinafter, I have devised a dragline apparatus having certain novel features of construction, combination and arrangement of parts and portions, as will be hereinafter described in detail and particularly set forth in the appended claims, reference being had to the accompanying drawing and to the characters of reference thereof which form a part of this application, in which:

Figure 1 is a perspective side view of a quarry in which my dragline apparatus is being used, and showing such apparatus in its preferred form of construction; Fig. 2 is an enlarged top view of the bucket in its preferred form of construction, showing the same connected to a fragmentary portion of a drag cable; Fig. 3 is a side elevational view thereof; Fig. 4 is a front elevational view thereof; and, Fig. 5 is a fragmentary front elevational view showing a modified form of construction of the bridle of the bucket through which the drag cable extends.

Like characters of reference refer to similar parts and portions throughout the several views of the drawing.

My dragline apparatus, as shown in Fig. 1 of the drawing, consists of a single cable 1 which extends from one of the cable winding drums 2 of any suitable winch or other machine, through the quarry or depression to be dragged, around a pair of laterally spaced apart pulleys 3 and 4, and then through another quarry or depression, and then to another winding drum 5 of the winch. The depressions through which the portions of the cable 1a and 1b extend are designated A and B. To each of these portions 1a and 1b are connected the digging buckets designated C and D, respectively. The portions 1a and 1b of the cable are sufficiently loose or slack that the buckets drag the bottoms of the depressions, as in the conventional dragline apparatus construction, and are so arranged that when the portion 1a is pulled toward the winding drum 2, the bucket C is filled and the material therein drawn toward the winding drum 2, while the bucket D is drawn empty toward the far end of the other depression B. The movement of the cable is then reversed whereby the bucket D is pulled and the material therein drawn toward the winding drums while the bucket C is drawn empty toward the far end of the depression A. Thus the apparatus has substantially twice the capacity of other dragline apparatus with practically only the employment of an additional digging bucket.

The digging bucket 6 illustrated is preferably flat and slightly longer from front to rear side than the width of the bucket. It will be noted, however, that the front and rear sides are herein referred to as ends, and the latter term implies and includes such definition.

The front end and the bottom of the bucket are open so that material may be received in the bucket by merely dragging the same over the ground. At the rear end of the bottom of the bucket are provided a plurality of downwardly and forwardly directed teeth 7 which extend below the bucket and forwardly of the rear end of the bottom for digging up the ground or material and for facilitating the retention of the material within the bucket, as shown best in Fig. 3.

At the forward and rear ends of the bucket are provided draft hitch or guy means. Each of the hitch or guy means, designated 8 and 9, consists of a pair of chains 8a and 8b, and 9a and 9b. Each pair of chains is secured at one end to the lateral sides of the bucket in any suitable manner, and the other ends of the chains are secured to the drag cable 1 in such a manner that when one of the draft hitch or guy means is pulled or put under tension by the drag cable, the other is loose or slack, as shown best in Fig. 3. With this construction or arrangement the digging bucket always rests flatwise upon the floor or bottom of the bed being dragged, that is, only the hitch or guy means pulling the bucket is under tension and the other is not in use.

At the upper side and preferably middle portion of the bucket is a bridle 10 which may be in the form of a bridge positioned transversely of the bucket and provided at its upper portion with a roller 10a. Through the opening of the bridle, or underneath the bridge, passes the portion 1c of the drag cable which connects the outer ends of the hitches or guy means. Such construction holds the bucket substantially upright and prevents the same from rolling over when the cable is taut or substantially so.

At the upper side of the bucket and at the front and rear ends thereof are provided rollers 6a and 6b respectively so as to prevent cutting of the cable and wear on the bucket and also to facilitate the dragging of the bucket when the same is tipped up at the ends.

It will be here noted that the bridle 10 may be otherwise constructed and may be made of a short chain or cable securing the middle of the upper portion of the bucket to the drag cable, or may be merely a loop of chain or cable through which the drag cable extends, as shown in one form in the modified structure illustrated in Fig. 5.

At the side and preferably the forward end of one side only is provided a digging device which may be only a tooth or a plurality of teeth extending a considerable distance laterally, so that the side bank or formation may be dug into to facilitate the same in falling down and enlarging the amount of material capable of being removed or dragged by the apparatus.

To facilitate the cutting or digging action of the digging device 11, the hitches or guy means 8 are preferably arranged so that the portion 8b is slightly longer than the portion 8a so that the cutting or digging device 11 is positioned farther to the side and a greater distance laterally than other portions of the bucket. Such adjustment of the portions 8a and 8b of the hitch or guy means may be easily effected if the same are made of linked chain.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a dragline apparatus, a digging bucket, draft hitches secured to each end thereof, a drag cable connected to the outer end of each hitch and extending outwardly therefrom, said cable also extending between the outer ends of the hitches, and means at the upper portion of the bucket for retaining the drag cable at said upper portion of the bucket and thereby preventing the bucket from rolling over.

2. In a dragline apparatus, a digging bucket, draft hitches secured to each end thereof, a drag cable connected to the outer end of each hitch and extending outwardly therefrom said cable also extending between the outer ends of the hitches, and a bridle positioned at the upper and middle portion and transversely of the bucket, said bridle comprising a bridge through which said cable extends.

3. In a dragline apparatus, a digging bucket, flexible draft hitches secured to each end thereof, a drag cable secured to the outer end of each hitch and extending outwardly therefrom, said cable also connecting the outer ends of the hitches, the length of the cable between the outer ends of the hitches being shorter than the sum of the lengths of the bucket and the hitches, and means at the upper portion of the bucket for retaining the cable at said upper portion and thereby preventing the bucket from rolling over.

4. In a dragline apparatus, a digging bucket, flexible draft hitches secured to each end thereof, a drag cable secured to the outer end of each hitch and extending outwardly therefrom, said cable also connecting the outer ends of the hitches, the length of the cable between the outer ends of the hitches being shorter than the sum of the lengths of the bucket and the hitches, and a bridle positioned at the upper and middle portion and transversely of the bucket, said bridle having an opening through which said cable freely extends.

5. In a dragline apparatus, a digging bucket, a drag cable, draft hitches secured to each end of the bucket and the outer ends thereof connected to the cable in such a manner that one of the hitches is loose when the other hitch is pulled outwardly and placed under tension by said cable, and means at the upper portion of the bucket for retaining the cable at said upper portion and thereby preventing the bucket from rolling over.

6. In a dragline apparatus, a digging bucket, a drag cable, draft hitches secured to each end of the bucket and the outer ends thereof connected to the cable in such a manner that one of the hitches is loose when the other hitch is pulled outwardly and placed under tension by said cable, and a bridle positioned at the upper and middle portion and transversely of the bucket, said bridle having an opening through which said cable freely extends.

7. In a dragline apparatus, a digging bucket, a drag cable located over the bucket and extending beyond the ends thereof, flexible draft guys secured to each end of the bucket and extending forwardly and backwardly from the lateral sides thereof and secured at their outer ends to said cable, said cable also connecting the outer ends of the guys, the length of the cable between the outer ends of the guys being shorter than the sum of the lengths of the bucket and the guys, and means at the upper portion of the bucket for retaining the cable at said upper portion and thereby preventing said bucket from rolling over.

8. In a dragline apparatus, a digging bucket, a drag cable located over the bucket and extending beyond the ends thereof, flexible draft guys secured to each end of the bucket and extending forwardly and backwardly from the lateral sides thereof and secured at their outer ends to said cable in such a manner that the guys at one end of the bucket are slack when the guys at the other end of the bucket are pulled taut by said cable, and a bridle positioned at the upper and middle portion and transversely of the bucket, said bridle having an opening through which said cable freely extends.

9. In a dragline apparatus, a continuous drag cable, a digging bucket, and flexible draft guys securing the lateral sides of the bucket to and intermediate the ends of the cable, the length of the guys extending to the lateral sides of the bucket being adjustable relative to each other, said bucket having digging means at the outer and lateral side thereof.

10. In a dragline apparatus, a continuous drag cable, a digging bucket, and draft means adapted to secure the bucket to and intermediate the ends of the cable at various angles.

11. In a dragline apparatus, a continuous drag cable, a digging bucket, and flexible draft guys securing the lateral sides of the bucket to and intermediate the ends of the cable, the length of the guys extending to the lateral sides of the bucket being adjustable relative to each other.

12. In an apparatus of the class described, a continuous drag cable a digging bucket having draft means extending in front of the same and secured at its outer end to and intermediate the ends of the cable, and digging means on the lateral wall and front end thereof, said means extending outwardly to the side for digging into a side bank independently of the transporting operation of the bucket.

13. In an apparatus of the class described, a continuous drag cable, a digging means extending laterally of the cable for digging into a side bank, and draft means secured to and intermediate the ends of the cable and adapted angularly to secure the digging means to the cable.

14. In a dragline apparatus, a continuous drag cable, a digging bucket, and draft means securing the bucket at various angles to and intermediate the ends of the cable, said digging bucket having digging means at the outer and lateral side thereof.

WILLIAM P. NEIL.